United States Patent
Liu

(10) Patent No.: US 7,512,644 B2
(45) Date of Patent: Mar. 31, 2009

(54) RATE MULTIPLICATION METHOD AND RATE MULTIPLIER

(75) Inventor: Chuan-Wei Liu, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 778 days.

(21) Appl. No.: 10/984,533

(22) Filed: Nov. 8, 2004

(65) Prior Publication Data

US 2005/0102333 A1 May 12, 2005

(30) Foreign Application Priority Data

Nov. 7, 2003 (TW) .............................. 92131184 A

(51) Int. Cl.
*G06F 7/52* (2006.01)
*H03K 21/00* (2006.01)

(52) U.S. Cl. ........................................ 708/103; 377/48
(58) Field of Classification Search ................. 708/703, 708/103; 377/47, 48
See application file for complete search history.

(56) References Cited

U.S. PATENT DOCUMENTS

| 3,733,475 A | * | 5/1973 | Haeusler et al. ............. 708/103 |
| 3,798,564 A | * | 3/1974 | Langham ..................... 331/1 A |
| 3,970,954 A | * | 7/1976 | Even ............................ 331/53 |
| 4,541,408 A | | 9/1985 | Ratelband |
| 4,704,723 A | * | 11/1987 | Markland ..................... 377/39 |
| 5,754,615 A | * | 5/1998 | Colavin ....................... 377/47 |
| 2003/0058052 A1 | | 3/2003 | Birk et al. |

FOREIGN PATENT DOCUMENTS

| WO | WO 02080369 | 10/2002 |
| WO | WO 03073244 | 9/2003 |

* cited by examiner

*Primary Examiner*—Chuong D Ngo
(74) *Attorney, Agent, or Firm*—J.C. Patents

(57) ABSTRACT

The present invention discloses a rate multiplication method for counting a sequence of original pulse signals and outputting a target pulse signal. In this method a comparison data and original pulse signal sequence is received. The original pulse signal sequence is counted in order to obtain a pulse count. Comparing the pulse count and the comparison data. If the pulse count is equal to the comparison data, a corresponding original pulse signal is outputted as the target pulse signal. Reset and recount the pulse count, and obtain which repeatedly. In this present invention the pulse count and the pulse interval between the target pulse signals can be determined freely according to a rate.

10 Claims, 4 Drawing Sheets

RATE MULTIPLICATION METHOD AND RATE MULTIPLIER

CROSS-REFERENCE TO RELATED APPLICATION

This application claims the priority benefit of Taiwan application serial no. 92131184, filed on Nov. 7, 2003.

BACKGROUND OF THE INVENTION

1. Field of the Invention

This invention generally relates to a rate multiplier, and more particularly to a rate multiplication method and rate multiplier thereof an adjustable multiplying rate.

2. Description of Related Art

In electronic circuit application, a signal frequency f is usually multiplied by a rate n/m, being smaller than 1, in order to obtain a smaller frequency signal. This operation is referred to as rate multiplication. For example, multiply a pulse signal of 10 MHz frequency by 3/10, a 3 MHz-frequency pulse signal is obtained. Visually, retaining three out of the ten of the pulse signals implements rate multiplication therein.

In some conventional method, n pulse signals are selected arbitrarily out of m pulse signals by hardware circuitry; in some other conventional method, n pulse signals with equal space or unequal space are selected via hardware circuitry out of m pulse signals. Relative detail can be referred to U.S. Pat. No. 4,541,408 and U.S. patent 2003/0058052.

However, the hardware circuitry in foregoing method is designed backwards from final waveforms, which causes substantial burden to circuit designers. In addition, the n pulse signals are assigned either equally spaced or unequally spaced, where pulse interval is not adjustable upon requirement, so that usage flexibility is relatively lower.

SUMMARY OF THE INVENTION

The present invention provides a rate multiplication method, so that both numerator and denominator of a rate n/m are adjustable. In addition, a time spacing between output pulse signal and adjacent output pulse signal is determined upon user's choice in the present invention.

The present invention further provides a ratio multiplier, using simple and practical circuits to implement foregoing contents.

The present invention further provides a rate multiplier, using a microprocessor for higher order multiplication.

The present invention provides a multiplying method, for counting original pulse signal sequence and outputting a target pulse signal. In this method a comparison data and an original pulse signal sequence are received firstly. Thereafter, the original pulse signal sequence is counted in order to obtain a pulse count. Then comparing the pulse count and the comparison data. When the pulse count equals the comparison data, a corresponding original pulse signal is outputted as the target pulse signal. Finally the pulse count is reset and recounted so as to repeatedly obtain the pulse count and the target pulse signal again.

According to one preferred embodiment of this present invention, the comparison data includes a plurality of interval values. The step of comparing the pulse count and the comparison data is to select one of the interval values (e.g. selecting one by one) until the pulse count equals the comparison data, which means the pulse count is equal to the interval value that is selected. Meanwhile, providing each of the interval values for the comparison data according to a rate, where the interval values are adjustable, so as to adjust the time spacing between the target pulse signals and adjacent target pulse signal.

The present invention provides a rate multiplier, for counting an original pulse signal sequence and outputting a target pulse signal; the rate multiplier includes a counter, a comparator, and a shift register. The counter serves to count the original pulse signal sequence and outputs the pulse count, and recounts the pulse count according to the target pulse signal. The comparator is coupled to the counter, for receiving pulse count and interval value. If the pulse count is equal to the interval value, the target pulse signal is outputted. The shift register is coupled to the comparator, for receiving the comparison data, and outputs interval values as the target pulse signal triggers.

The rate multiplier according to another preferred embodiment in this present invention, wherein the comparison data includes at least an interval value, and the shift register outputs one interval value one after another according to the target pulse signal. In this preferred embodiment, the interval value is compared upon a rate, and each interval value is adjustable, so as to adjust the time spacing between each of the target pulse signal and adjacent target pulse signal. Further in this preferred embodiment, a memory is included, which contains at least one set of comparison data, for receiving and outputting the comparison data which is selected according to the selecting signal.

The present invention provides another rate multiplier for counting an original pulse signal sequence to output a target pulse signal. The rate multiplier includes a counter, a comparator and a microprocessor. The counter serves to count the original pulse signal sequence and output a pulse count, and recount the pulse count according to the target pulse signal. The comparator is coupled to the comparator for receiving the pulse count and an interval value. If the pulse count is equal to the interval value, the target pulse signal is outputted. The microprocessor is coupled to the comparator for receiving a selecting signal, and outputs the selected interval value according to the target pulse signal.

According to one preferred embodiment in this present invention, at least one set of comparison data, which includes at least an interval value, is built in the microprocessor. The microprocessor selects one set of the comparison data according to the selecting signal, so as to output the selected interval value one after another according to the target pulse signal. Moreover, a memory, coupling to the microprocessor, is also provided. The memory includes at least one set of comparison data for serving the microprocessor. Wherein the microprocessor read the comparison data from the memory according to selecting signal, where comparison data includes at least an interval value, so that the microprocessor outputs selected interval value one by one out of the comparison data as the target pulse signal triggers. An interval value of the comparison data is also provided according to a rate, so that to adjust each the interval value for adjusting time spacing between each the target pulse signal and adjacent pulse signal.

The present invention visually provides a rate multiplication method which determines a pulse count and a pulse interval of the target pulse signal. In other words, a set of comparison data including a plurality of interval values, where a sum of which being the denominator m of a rate n/m and the quantity of which being the nominator, is provided. Since each the interval value can be freely allocated (as long as the sum is equal to m), each time spacing of the target pulse signal can be determined upon request, so as to completely improve problems in conventional art.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

Figure 1:
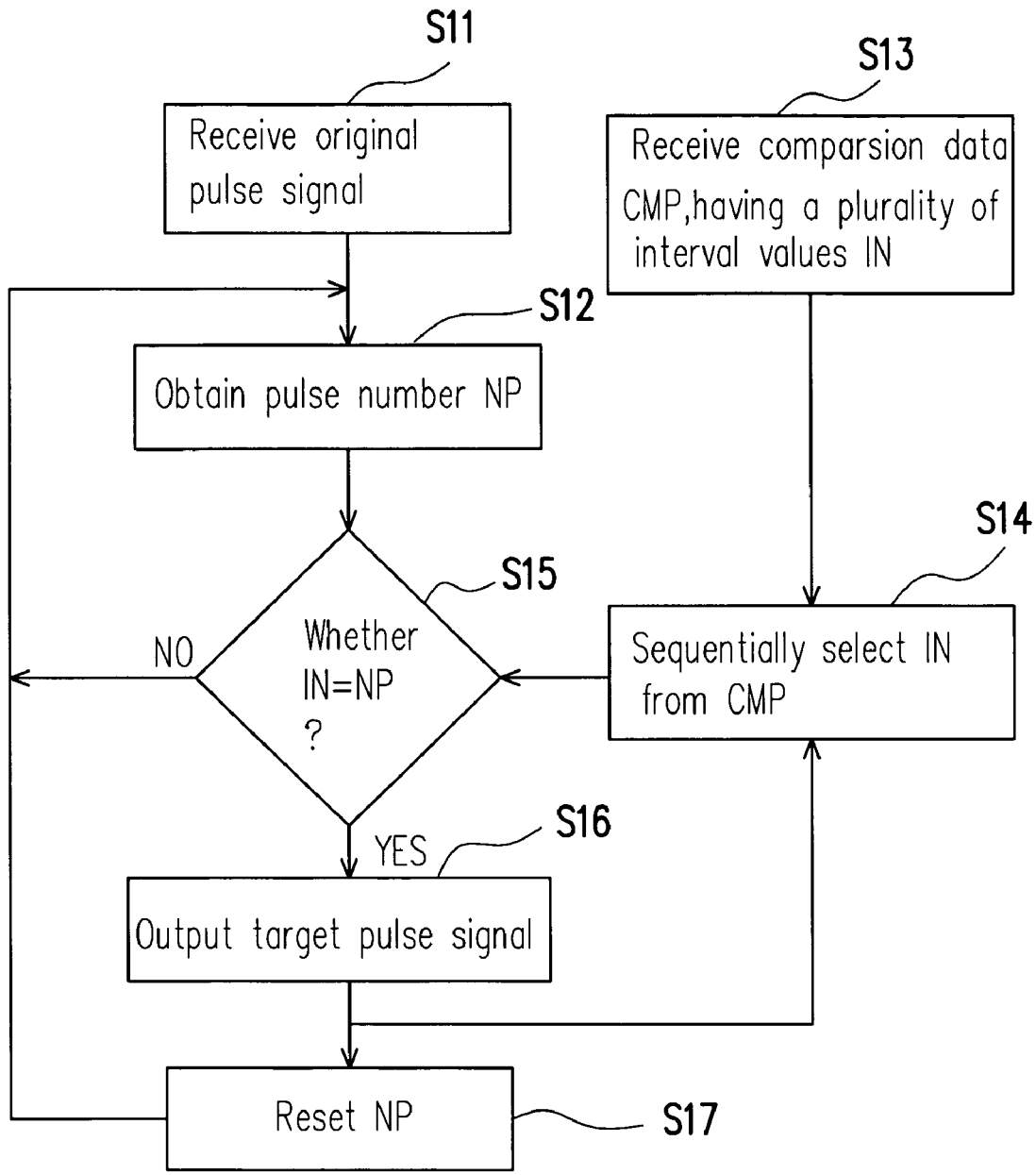
FIG. 1 is a diagram illustrating a flowchart for a rate multiplication method according to a preferred embodiment of the present invention.

Referring to FIG. 1, it is a diagram illustrating a flowchart for a rate multiplication method according to one preferred embodiment of the present invention. In step S11 as shown in FIG. 1, receiving an original pulse signal sequence, than obtaining a pulse count NP (step S12) of the original pulse signal. Meanwhile, a comparison data CMP is received (step S13), which includes a plurality of interval values IN. In step S14, one of the interval values IN is selected (e.g. selected one by one). Comparing the selected interval value IN and the pulse count NP in step S15, if being equal, proceed to step S16, otherwise proceed to compare the interval value IN and the pulse signal NP again. The target pulse signal is outputted in step S16, thereafter step S14 and S17 are deployed at the same time, that is to select (e.g. selecting one by one) a next interval value IN (step S14), and resetting the pulse count NP for recounting (S17). When the step S17 and S14 are completed, steps S12 and S15 are implemented, repeating accordingly.

Another preferred embodiment of the present invention provides a rate multiplication method, including (1) receiving a first signal array, the period of which is M; (2) receiving a rate multiplication signal N, where N is smaller than M; (3) based on a reference data table, selecting a N1$^{th}$ signal, a N2$^{th}$ signal, ..., and a Nn$^{th}$ signal out of every M signal in the first signal array; and (4) outputting a second signal array, which is composed of the selected N1$^{th}$ signal, N2$^{th}$ signal, ..., and Nn$^{th}$ signal. Wherein the reference data table is a table for providing the values of N1, N2, ..., and Nn for each possible combination of M and N. Wherein, a selecting signal X could be also received when the rate multiplying signal N is received, and X indicates which combination of N1, N2, ... Nn to use when there is Y combinations of N1, N2, ..., Nn in the reference data table upon M--N combination, where X is not larger than Y. It is surely that a modifying message can be further received for modifying content of the reference data table for user's convenient.

Figure 2:
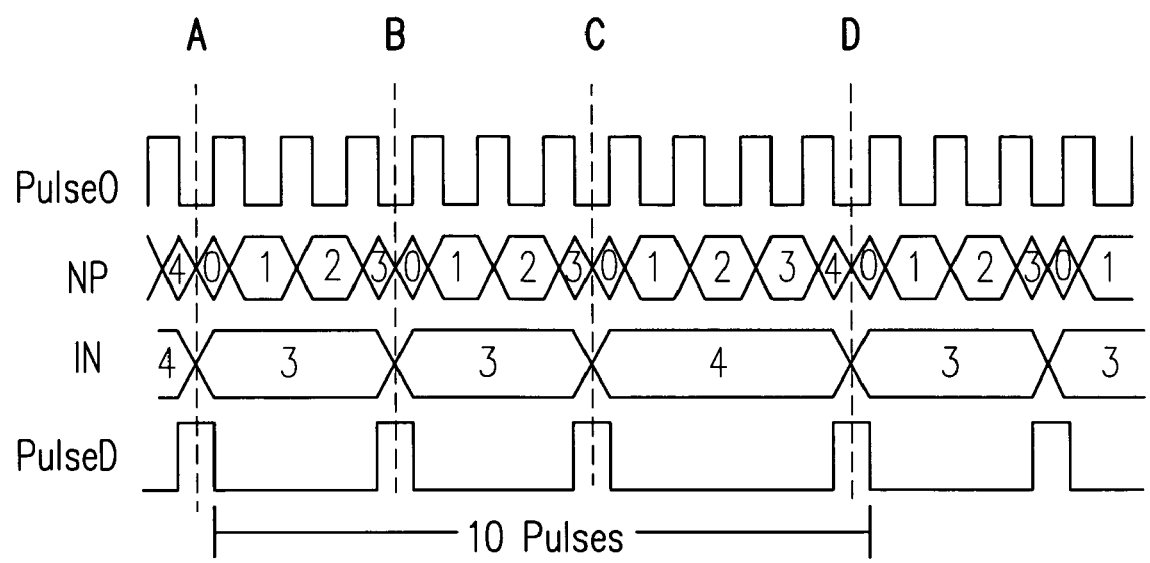
FIG. 2 is a diagram illustrating signal timing according to a preferred embodiment of the present invention.

In order to describe present invention in detail, a rate 3/10 is exemplary along with FIG. 1. FIG. 2 is a diagram illustrating signal timing according to one preferred embodiment of the present invention. Referring to FIGS. 1 and 2 herein, the frequency of the original pulse signal sequence is multiplied by the rate in this preferred embodiment, for example, the rate being 3/10. Visually, three out of every ten pulse signals are selected from the original pulse signal sequence (to be the target pulse signal to output). However, in order to determine which three out of ten to be selected, the selecting method is associated with the time spacing between adjacent pulses. A set of 3, 3, 4 interval values is exemplary for describing this preferred embodiment herein. The interval values can be allocated freely, as long as the quantity of interval values is equal to the numerator of the rate, and the sum of all the interval values is equal to the denominator of the rate.

Referring to FIG. 2, at time A the pulse count NP is counted from zero up, where pulses of the original pulse signal sequence Pulse0 is counted (10 original pulse signals are in a period herein). A first interval IN (i.e. 3) is selected from the comparison data CMP. When the pulse count NP is equal to the interval value IN (i.e. three original pulse signals are counted), a target pulse signal PulseD is promptly outputted (i.e. outputting the third original pulse signal), and pulse count NP is reset and recounted (at time B in the figure). As resetting and recounting the pulse count NP, a next interval value IN is subsequently selected from the comparison data CMP (being 3 in this example). As described above, the pulse count NP is equal to the interval value IN (i.e. three original pulse signals are counted), a target pulse signal PulseD is outputted (i.e. the sixth original pulse signal is outputted) at time C in the figure. A next interval value IN is subsequently selected (being 4 in this example). The pulse count NP is again reset and recounted original pulse signal Pulse0, till the pulse count NP is equal to interval value IN again (i.e. 4 more original pulse signals are counted, and the tenth original pulse signal is outputted) at time D in the figure. Repeatedly implementing the above steps completes rate multiplication thereby.

In this preferred embodiment a rate 3/10 and interval values 3, 3, 4 are exemplary, yet the numerator and the denominator of the rate can be setup randomly upon user's choice (i.e. this present invention applies to different denominator and numerator). The time spacing between the target pulse signal is upon user's setup as well. Thus the scope of the present invention is not limited to the description according to the preferred embodiment herein.

Figure 3:
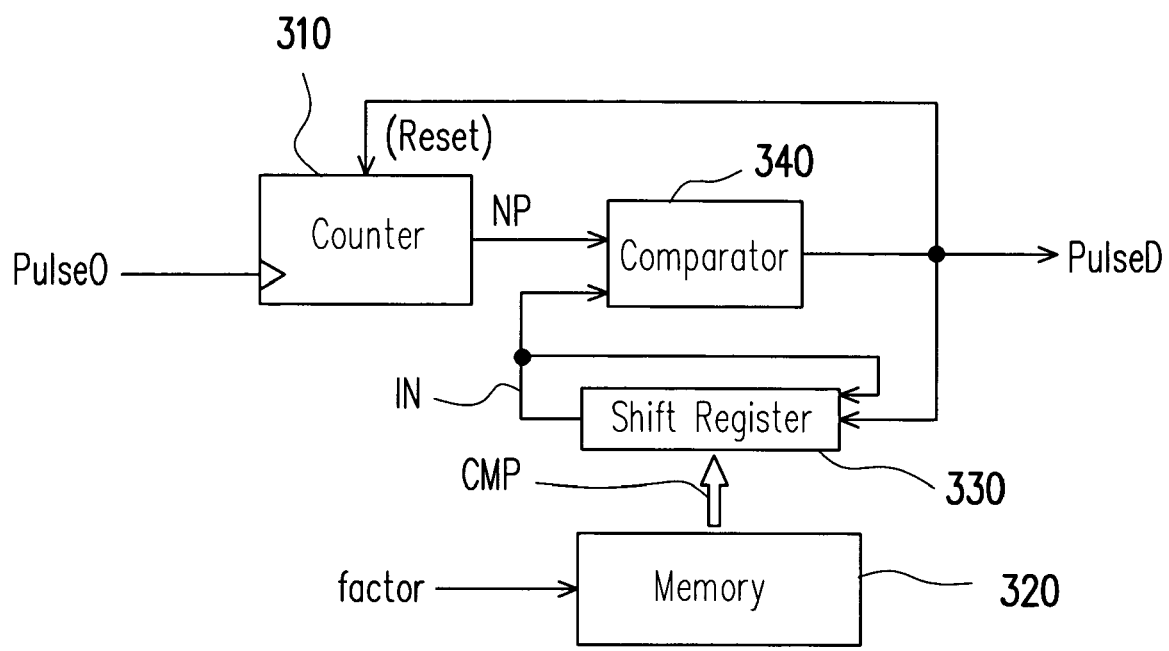
FIG. 3 is a block diagram illustrating a rate multiplier according to a preferred embodiment of the present invention.

In the below steps, a block diagram illustrating a circuit according to a preferred embodiment is described for this present invention. Referring to FIG. 3, it is a block diagram illustrating a rate multiplier according to one preferred embodiment of the present invention. Wherein a counter 310 receives and outputs the pulse count NP as original pulse signal sequence Pulse0 triggers for progressively counting from an initial value, which is zero, for example. The counter 310 also receives the target signal PulseD so as to reset and recount the pulse count NP. A memory 320 records a plurality of sets of comparison data, each set of which is obtained according to various rates. Take rate 3/10 as an example, a set of 3, 3, 4, or 1, 5, 4, is valid for a set of comparison data CMP. Or if a rate being 5/16 is the resulting multiplication, then each combination of interval values (e.g. 3, 3, 3, 3, 4, or 1, 2, 3, 4, 6) are stored in the memory 320 beforehand. The memory 320 selects one set of comparison data according to selecting signal factor, and outputs the selected comparison data CMP, wherein the memory 320 can be combined with the shift register 330 (e.g. built-in memory in the shift register 330). That is, in the preferred embodiment of the present invention, the original pulse signal sequence Pulse0 is received and the selecting signal factor is selected for the original pulse signal Pulse0 transforming to the target pulse signal PulseD upon user's request. It s surely that the comparison data in the shift register 330 can be modified according to an external signal for user's convenience.

The shift register 330 receives and stores the selected comparison data CMP, and sequentially outputs one of the interval values IN as the target pulse signal PulseD triggers. As the shift register outputs the interval value IN, the interval value IN is rotationally shifted to the tail of the comparison data CMP sequence. For example, if the comparison data being 1, 2, 3, 4, 6, then after outputting the interval value 1 the comparison data becomes 2, 3, 4, 6, 1. The selecting method for each interval value IN of the comparison data as described above is only an example of this preferred embodiment. For the skill in the art, it is obvious that other implementation also applies if result is identical to this preferred embodiment. The comparator 340 also receives the pulse count NP and compares which with the interval value IN, if being equal, the target pulse signal PulseD is outputted.

Figure 4:
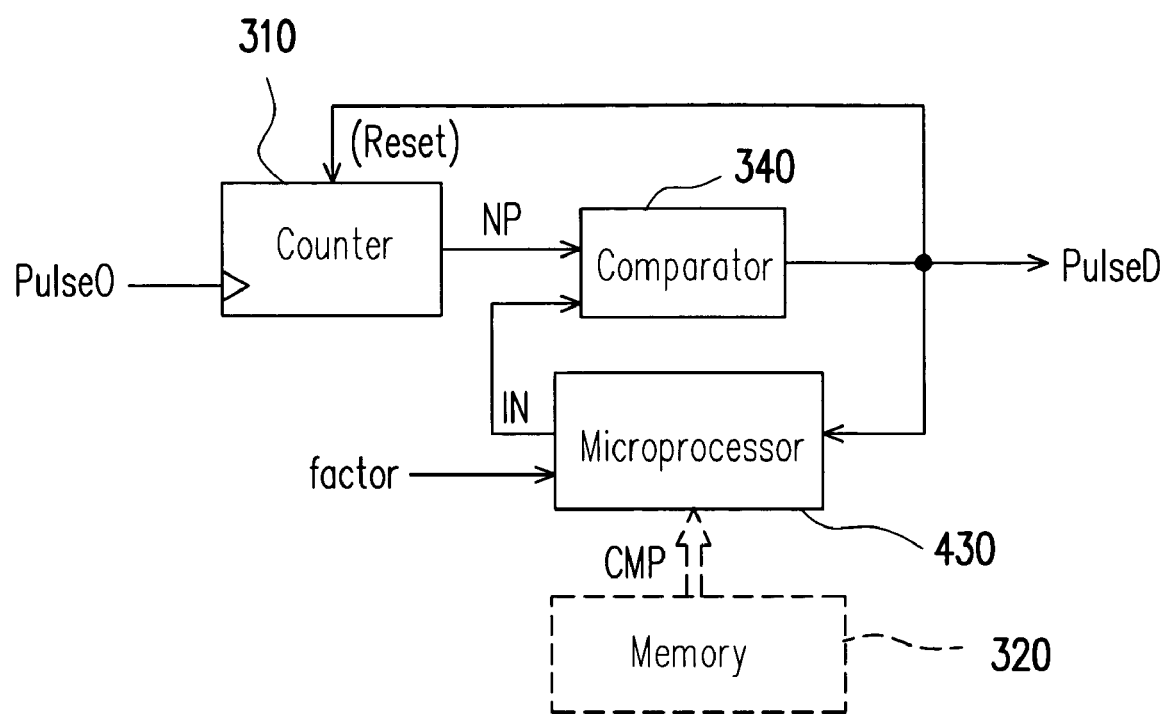
FIG. 4 is a block diagram illustrating a rate multiplier according to another preferred embodiment of the present invention.

Another preferred embodiment is described as follows for this present invention. Referring to FIG. 4, it is a block diagram illustrating a rate multiplier according to another preferred embodiment of the present invention. This preferred embodiment is similar to the previous preferred embodiment, yet a microprocessor replaces the shift register 330 therein. The microprocessor 430 manages to provide control functions based on built-in firmware, where a memory is usually built-in (not illustrated), so that sets of comparison data CMP are stored beforehand. The microprocessor receives selecting signal factor and selects one set of the comparison data CMP, so as to sequentially outputs each the selected interval value IN among the comparison data CMP as the target pulse signal PulseD triggers. In this preferred embodiment, the sets of comparison data CMP can also be stored in the memory 320 which serves selected comparison data CMP according to the microprocessor 430. Other parts of this preferred embodiment that is not described is identical to that in the previous preferred embodiment, thus is omitted herein.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A rate multiplier, for counting an original pulse signal sequence and outputting a target pulse signal, the rate multiplier comprising:

a counter, for receiving and counting the original pulse signal sequence and outputting a pulse count, and resetting and recounting the pulse count according to the target pulse signal;

a comparator, coupling to the counter, for receiving the pulse count and an interval value, and outputting part of the original pulse signal corresponding to the interval value as the target pulse signal when the pulse count is equal to the interval value; and a shift register, coupling to the comparator, for receiving a comparison data and the target pulse signal, so as to output the interval value.

2. The rate multiplier as recited in claim 1, wherein the comparison data comprises at least one the interval value, and the shift register is triggered according to the target pulse signal and outputs one of the interval values.

3. The rate multiplier as recited in claim 1, wherein the shift register sequentially outputs each of the interval values.

4. The rate multiplier as recited in claim 1, wherein the comparator receives a rate, and provides the interval value of the comparison data according to the rate, and adjusts each of the interval value so as to adjust time spacing between each of the target pulse signal and adjacent the target pulse signal.

5. The rate multiplier as recited in claim 1 further comprising a memory coupling to the shift register, wherein the memory comprises the comparison data, and receives and selects the comparison data according to a selecting signal and outputs thereby.

6. The rate multiplier as recited in claim 5, wherein the comparison data comprises at least one of the interval values, the shift register selects one of the comparison data according to a select signal, and sequentially outputs the interval value of the selected comparison data according to the target pulse signal.

7. The rate multiplier as recited in claim 5, wherein the shift register reads the comparison data from the memory according to a selecting signal that is received, the comparison data comprises at least one of the interval values, the shift register sequentially outputs the interval value of the comparison data that is selected according to the target pulse signal.

8. The rate multiplier as recited in claim 7, wherein the shift register further provides the interval value of the comparison data according to a rate, and adjusts each of the interval values so as to adjust time spacing between each of the target pulse signal and adjacent the target pulse signal.

9. The rate multiplier as recited in claim 1, the memory is built in the shift register.

10. The rate multiplier as recited in claim 1, wherein the shift register further modifies the comparison data according to an external signal.

* * * * *